Oct. 20, 1931.  W. D. SHOEMAKER  1,828,079
TRACTOR EQUIPMENT COMBINATION
Filed Feb. 29, 1928   5 Sheets-Sheet 1

Inventor
Wm. D. Shoemaker

Oct. 20, 1931. W. D. SHOEMAKER 1,828,079
TRACTOR EQUIPMENT COMBINATION
Filed Feb. 29, 1928 5 Sheets-Sheet 4

Inventor
Wm. D. Shoemaker

Oct. 20, 1931.  W. D. SHOEMAKER  1,828,079
TRACTOR EQUIPMENT COMBINATION
Filed Feb. 29, 1928  5 Sheets-Sheet 5

Patented Oct. 20, 1931

1,828,079

UNITED STATES PATENT OFFICE

WILLIAM D. SHOEMAKER, OF DRUMMOND, CHEVY CHASE, MARYLAND

TRACTOR EQUIPMENT COMBINATION

Application filed February 29, 1928. Serial No. 258,067.

This invention has a relation to attachments for tractors and more particularly to such attachments capable of being mounted upon either the front or rear end of the tractor, and changed from the one position to the other by a rearrangement of the component assemblies.

While the invention has been illustrated in connection with a hoist attachment for tractors, and has a special application to this type of equipment, it will be understood that it also has application to other pieces of tractor equipment. Therefore, in the following description, which will be confined to a hoist attachment, it will be understood that the specific attachment is largely used as illustrative.

Equipment in the nature of tractor attachments has been mounted upon both the front and upon the rear of the tractor, and when so mounted they have been driven from the tractor engine by taking the power from the belt pulley shaft, which projects from the side of the tractor. Some pieces of tractor equipment are more useful when mounted upon the rear, and others find their greatest usefulness when mounted upon the front end of the tractor. Hoist or winch attachments have been mounted upon both ends of the tractor, and in some cases a front end winch is most useful, as where the tractor must be equipped with wheel substitutes known as the full crawler.

There are other uses satisfied only by the employment of rear end winches, as where a very heavy piece of machinery is being moved, when the tractor is advanced and anchored and the winch used to advance the machinery being hauled.

It is therefore necessary for distributors and dealers of tractor equipment to offer for sale both rear end and front end winches, and in order to service these two types of winches it has been heretofore necessary to maintain a stock of repair parts for each type of winch. By the present invention, the one type of winch is designed for mounting upon both ends of the tractor; both the front and rear end winches are serviced from the same stock of repair parts, and a winch assembled for attachment to either end of the tractor can be disassembled and reassembled for attachment to the other end.

The object of the invention is to produce a design of a piece of tractor equipment capable of being assembled for either front end or rear end mounting.

Another object is to produce such a piece of equipment of assemblies, the parts of which can be reversed in their relative positions.

Another object of the invention is to produce a piece of tractor equipment which might be securely mounted upon either end of the tractor, and transferred from one end to the other with ease, and without the necessity of machine shop treatment.

A fourth object of the invention is the production of a hoist attachment for tractors having the characteristics hereinbefore set forth.

A further object of the invention is the improvement of the details of construction of a hoist attachment for tractors.

A still further object is to provide encircling clamps for the tractor axle housings which may be employed in securing either a front end or a rear end winch to the tractor.

A still further object is the production of a hoist attachment for tractors which will have the capabilities set forth, and also possess the necessary qualities required of a piece of equipment of this type, namely, ample spool capacity, strength of parts, neatness of appearance, ease of manipulation, etc.

Other objects and advantages of the invention will appear in the following description and the novel features thereof will be particularly pointed out in the appended claims.

Like reference numerals indicate like parts throughout the several figures of the drawings, in which—

Fig. 4 is a section taken on the line 4—4 of

Fig. 3, showing one end of the hoist attachment in elevation.

Fig. 5 is a view similar to Fig. 4 of the opposite end of the hoist attachment.

Fig. 6 is a detail.

For the purpose of giving a clearer description, the hoist or winch illustrated will be deemed as made up of a number of assemblies of elements, as follows:

1. The frame assembly comprising all those parts having no movement such as attaching angles, frame sides, guards, etc.,
2. The spool assembly comprising those parts having a rotary movement and carrying the wound line,
3. The countershaft assembly comprising the pinion shifter, brake lever, and associated parts,
4. The drive assembly comprising the sprockets and chain for transmitting power from the pulley shaft to the countershaft,
5. The pawl assembly, and
6. The extension clutch control assembly.

Each of these assemblies will be described in detail and the individual functions thereof pointed out. Their joint operations will then be set forth, after which will be discussed the reversibility of the parts of the assembly for the purpose of changing the position of the attachment from the front to the rear of the tractor, or from the rear to the front of the tractor.

The skeleton winch frame comprises the side members 10 and 11 held in spaced relationship by the upper cross angle 12 and the lower cross angle 13, bolts 14 being employed for securing these parts together. The side frame members are made of cast steel and have a flange 15 and a web 16. Cast with the frame sides are the spool bearing blocks 17 and the drive shaft bearing blocks 18, both spool bearing blocks and one counter shaft bearing block being provided with covers 19.

The bearing block 17 is provided with a boss 20 for the support of guards; the bearing block 18 is provided with a lug 21 for the support of a brake lever; the lower portion of the frame side below the block is provided with a pawl supporting web 22. The rear edge of the frame side is provided with an enlargement 23 through which an aperture is made for the reception of a bolt end; and adjacent the block 17 is an anchor eyelet 24.

It will be appreciated that the blocks 17 and 18, the boss 20, the lug 21, the supporting web 22, the enlargement 23 and the anchor eyelet 24 are all made in one piece with the frame side, and that the frame sides 10 and 11 are exact duplicates, except that one is right and the other is left.

So far as this skeleton winch frame is concerned, it is the same without change of relative position of parts in both the front and rear end installations. To attach this skeleton frame, as described, to the rear of the tractor, vertical angles 25 and 26 are bolted to the cross angles 12 and 13 and the attaching angles are secured to the differential housing 27 of the tractor by means of the four rear bolts in the differential housing. To obtain a good attachment, the lower cross angle 13 is provided with a recess in its upper edge, as shown at 28, to fit the draw bar cap edge of the tractor and bolt holes 29 are provided near the recess by means of which the lower cross angle may be attached to the tractor at this point.

Figure 2:
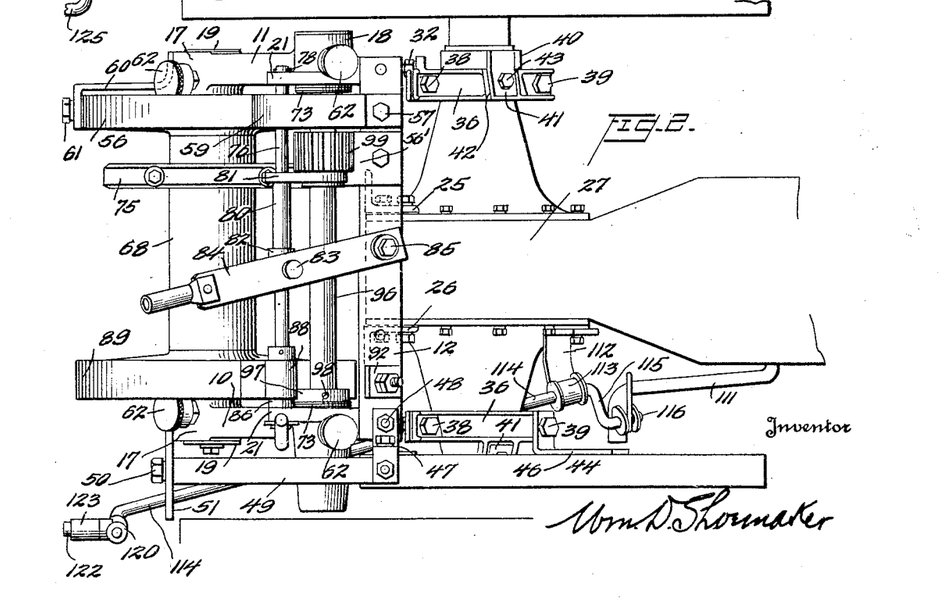
Fig. 2 is a plan of the same parts.
Figure 3:
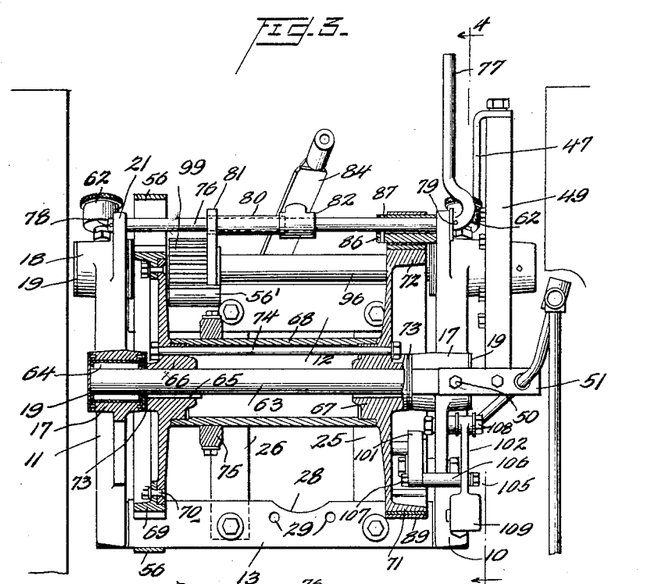
Fig. 3 is a vertical section through the hoist attachment.

In addition to these points of attachment, provision is made for securing the winch side frames directly to the axle housing of the tractor. As shown in Fig. 2, clamps or clips are provided on each side of the axle housing, which clamps are provided with apertures 30, which are tapped to receive a connector 31 in the form of a screw threaded rod locked in position by the lock nut 32 and passing through the boss 23 in the side frame 10, the connector being locked in position with relation to the side frame by the nuts 34 and 35.

The two parts of the clamps 36 and 37 are held firmly together and upon the axle housing by the cap screws 38 and 39. It will be appreciated that these clamp elements, in connection with the connector 31, constitute a point of attachment between the side frame 10 and axle housing; and that these clamps are provided, as shown in Fig. 2 upon each side of the tractor. The clamps differ from each other slightly, in that, the winch is offset a little, that is, the center line of the winch does not coincide with the center line of the tractor which will be apparent from an inspection of Fig. 2, and therefore the clamps engage the axle housing at slightly different points.

The axle housing of the tractor is provided with a channel or groove into which a curved portion 40 of a spacer 41 fits. The upper clamp element 36 is provided with a channel 42, into which the projection of the spacer extends and to which this projection is secured by the cap screw 43.

It will now be understood that the spacer projection can be made longer or shorter as the needs of the clamp demand. The clamp element shown in elevation in Fig. 1 will demand a longer projection than that shown in plan at the top of Fig. 2. In any event, the purpose of the spacer is to hold, in connection with the groove in the axle housing, the clamp elements at the proper point on the axle housing.

The guard 44 for the drive chain 45 is supported at its forward end by the standard 46, which at its lower legged end is secured in position by the cap screw 39.

A second standard 47 is bolted at its lower legged end to the upper cross angle 12, as shown at 48, in Fig. 2, which second standard is utilized as a support for the rear end of the chain guard 44 and for the forward end of the sprocket guard 49. This sprocket guard is bolted to the strap 51 at its rear end and the strap 51 is bolted to the boss 20 by the cap screw 50. An aperture in the strap 51 is utilized as a bearing and support for the extension clutch control, as will later appear.

It will be noted that the guard 44 is formed at one end by cutting one flange and bending it vertically upward, as at 52, and providing in the bent up portion, two apertures, one of which is shown as utilized for the purpose of securing the guard to the second standard 47. The second bolt hole could as well be so utilized, and this is desirable when a smaller sprocket is used on the winch. In like manner, the guard is cut and a portion struck up, at 53, for the purpose of attaching it to the standard 46, and it will be noted that the standard 46 is provided with two bolt holes permitting an adjustment of the guard to fit a change of sprockets. In this connection, it will be understood at this time that both the sprocket at the end of the tractor belt pulley shaft and that on the winch itself may be of different sizes than those shown on the drawings and that the mounting of the guard 44 as described will permit of such changes, and still properly guard the chain.

The sprocket guard is utilized for the purpose of supporting an extension throttle 54 by mounting upon the guard an eye-bolt 55.

In practice, when the winch is being used, anchor cables are passed around the axle housing of the tractor and extended forward under the front of the tractor to suitable anchorage forward of the tractor, and generally speaking, this is a satisfactory anchorage for the winch.

A gear guard 56 is bolted to the upper cross angle 12, at 57, and to the lower cross angle at the point 58. This guard has the form shown in Fig. 5, which is generally semi-circular with a bulge 59 at one end which is utilized to guard the pinion of the winch, while the main portion is employed to guard the spool gear. The guard 56 is further held by the third standard 60 having its legged end bolted to the boss 20′ on the side frame 11. The bolts 61 are the means of attaching the standard to the guard.

The winch frame is apertured and tapped at the proper places to receive grease cups 62. A pinion guard 56′ is attached to the upper cross angle 12 and extends under the driving pinion to protect the cable which might be wound on the drum from coming into contact with the pinion.

The spool assembly of the winch comprises the spool shaft 63 journalled in the roller bearings 64 contained in the blocks 19. Splined at 65 to the shaft 63, are the gear hub and flanges, and the brake hub and flange 67, the hub sections of these parts supporting the shank 68 of the drum upon suitable shoulders. The sides of the drum are formed by the flanged portion of the members 66 and 67. The flange 66 is formed to support the ring gear 69, these parts being secured together by the bolts 70. The making of the ring gear readily detachable is a distinct advantage in that, worn gears may be readily replaced by new gears. The flange 67 has formed with it integrally the brake drum 71 and the lugs 72 on its inner face cooperate with the holding pawl to be later described.

Suitable spacing washers and grease retaining washers 73 are provided between the hubs and bearings. The hubs are held together by means of tie rods 74, of which there are three, while a divider 75 made of wood in two sections and bolted together is mounted upon the shank 68 to separate the cable which is in use from that which is wound on the spool for storage purposes only.

Suitable provision is made in the flange 66 for the attaching of a cable. The ring gear may be provided, if found desirable, with lugs similar to those found on the inner face of the drum gear, or the bolts 70 may be formed in such a manner that they will cooperate with a holding pawl.

It will be noted that power applied to the gear end of the spool will be transmitted to the brake drum end through the shaft 63 and that relatively little torsional stress is placed upon the shank 68. In the lugs 21 formed on the blocks 18 is mounted an oscillatory shaft 76 which is extended, as shown in the brake handle 77. The shaft is held against longitudinal movement by the pins 78 and 79 on the outside of the lugs 21. This shaft serves two purposes. It constitutes means for applying the brake, and is also a support for the pinion shifting mechanism. Each of these purposes will now be taken up for detail description.

Slidable longitudinally of the shaft 76 is a coupling 80 made of ordinary pipe section, one end of which is screwed into a yoke 81 engaging a groove in the drive pinion. On the opposite end of the coupling is screwed a T 82, which supports a pivot 83 passing through the shift lever 84. This shaft lever is pivotally mounted at 85 to the upper cross rail 12, either the pivot 83 or the pivot 85 being made loose to permit the necessary movement of the coupling along the shaft 76.

It will be appreciated that by manipulation of the lever 84, the drive pinion may be shifted into and out of engagement with the ring gear. On the shaft 76, is also splined a brake eccentric 86 and this eccentric is rotatable with the shaft 76 and is held against longitudinal movement on the shaft by any suitable means, as the pin 87 and the lug 21, washers where necessary being employed to space the eccentric from these elements.

Around the eccentric is looped, as at 88, the end of a brake band 89. This band is properly lined and grips the brake drum at about three fourths of its circumference. The opposite end of the brake band is riveted to a rod 90, which passes through the cross angle 12 and is held by the nut 91, any suitable spacer, as 92, being provided to hold the rod in proper angular relation to its associated parts. It will be apreciated that by means of the nut 91, suitably locked, the brake band may be adjusted.

The drive assembly of this attachment comprises a drive sprocket 93 placed on the belt pulley shaft of the tractor, as a substitute for the pulley ordinarily furnished for the tractor. From this drive sprocket power is transmitted to the winch sprocket 94 through the medium of the chain 45. The winch sprocket is bolted to a hub 95 which is mounted upon the counter shaft 96 and imparts rotary motion to the counter shaft. This shaft is bearinged in the blocks 18 and carries a collar 97 held on the shaft by a set screw 98; this collar and the cover 19 on the block 18 maintains the countershaft against longitudinal movement. The hub of the sprocket is also held on the shaft by set screw.

At the gear end of the winch there is slidably mounted upon the countershaft the pinion 99, which is provided with a groove 100 at one side thereof in which the yoke 81 rests. The shaft is provided with a key and the pinion with a groove, whereby the rotary motion of the shaft is imparted to the pinion. It will be recalled that the lever 84 is employed to shift the yoke 81 and therefore shift the pinion 99 into and out of engagement with the ring gear 69 on the spool.

Figures 4, 5, 6:
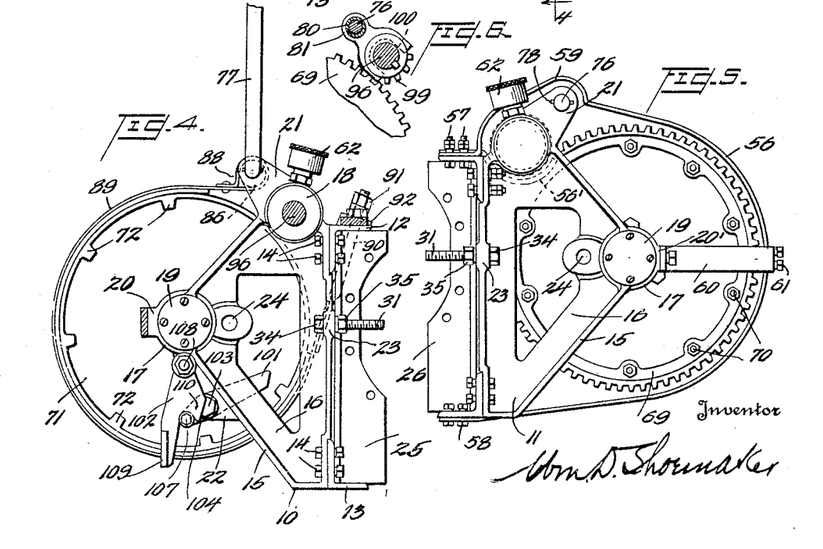

The holding pawl assembly is shown in Fig. 4 and is described particularly in an application for patent filed by Frank L. Young, December 9, 1927, Ser. No. 238,841. It will be however, described generally here as its reversibility is involved.

The holding elements comprise a pawl 101 and a trip 102. The pawl is mounted upon the pivot bolt 103 working in the aperture in the lower portion of the web 22 of the frame element 10. The toe of the pawl is adapted to engage the lugs 72 cast on the inner face of the brake drum. The heel 104 of the pawl is apertured to support the pintle 105, which consists of a sleeve 106 and bolt 107. In the upper aperture in the web is the pivot bolt 108 upon which swings the trip 102. At the lower end of the trip is the pedal 109 projecting beyond the rim of the brake drum, to be engaged by the toe of an operator's shoe when it is desired to shift the pawl from active to inactive position or vice versa. Intermediate its ends the trip is provided with the cam projection 110 defining two cam surfaces, both of which are designed to ride upon the sleeve 106 to lift the pawl past the cam projection 110. Between the cam projection and the pedal is a recess or pocket in which the sleeve 106 is traped when it is desired that the pawl be inactive. So long as the sleeve lies in this position, shown in Fig. 4, its toe will be held elevated out of engagement with the lugs 72, and no holding of the winch spool will be effected.

Figure 1:
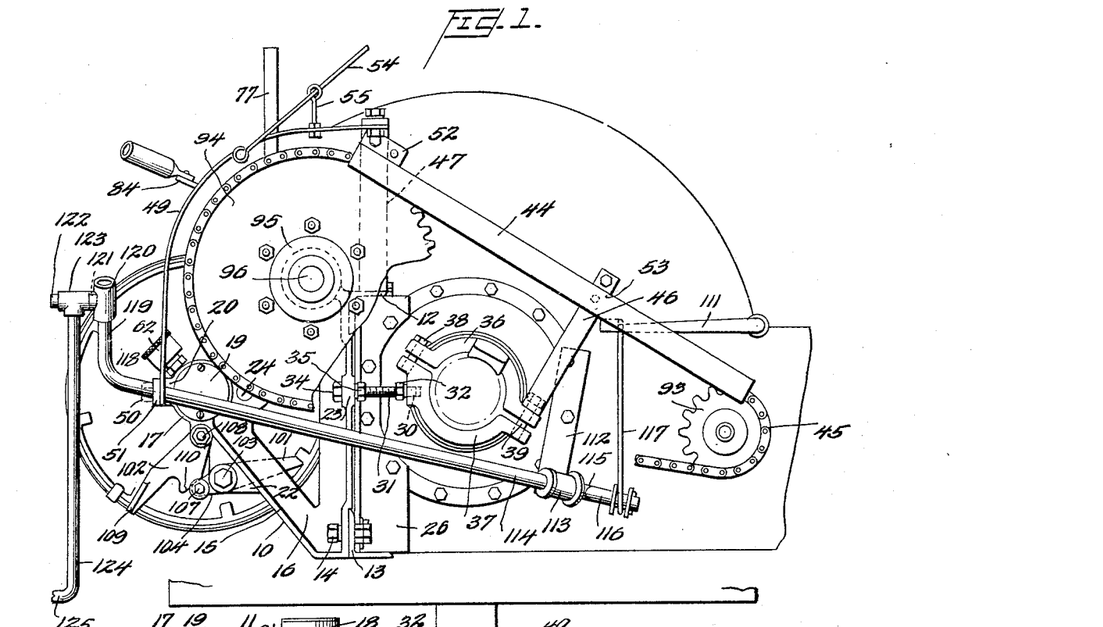
Fig. 1 is a side elevation of the rear of a tractor having a hoist attachment mounted thereon, parts of the tractor being omitted for the purpose of showing the details of the attachment.

But when the pawl is in the position shown in Fig. 1, the toe end, being relatively heavy, will fall into contact with the inner face of the brake drum with the heel end lifted, when the sleeve will ride up the cam surface and swing the trip to the position shown when it barely projects beyond the outer surface of the brake drum. In this condition of the parts, the pawl is lifted to permit the passage of the lug 72 under it in the operation of the winch, but will drop behind the lugs and prevent retrograde movement of the spool. In this condition, of the parts, the pawl is active.

It is only necessary to push the pedal 109 from its position shown in Fig. 1 to that shown in Fig. 4 to cause the pawl to become inactive. A movement of the trip in the opposite direction would cause the pawl to again become inactive.

The extension clutch control assembly is the same as that described in the application for patent of Frank S. Young, filed December 9, 1927, and serially numbered 238,840. Full description herein will not be necessary, but it will be generally described because the reversibility of these parts is an element of the hoist attachment disclosed herein.

The numeral 111 indicates the tractor clutch pedal which is usually operated from the seat on the rear of the tractor (not shown). Depending from the differential housing is a strap 112 carrying a bearing 113 at its lower ends and the frame of the winch provides a second bearing in the element 51. In these two bearings a control rod 114 is mounted, the forward end of which is bent as at 115, to provide a crank 116 out of alignment with the control rod. The crank is connected by a suitable link 117 with the tractor clutch pedal and it will be appreciated that when the control rod is rotated to bring the crank to a lower level, the clutch pedal will be depressed.

The rear end control rod is bent upwardly and outwardly as shown at 118, forming a stub 119 on which is screwed a plain T 120, in the opening 121 of which is screwed a short shaft on whose end is the cap 122 and on the body of which is a second plain T 123, free to revolve on the shaft.

It will be appreciated that an opening is provided at one end of the T 120 and another opening centrally of the T 123. If it is desired to have an extension clutch control operated by the use of the hand of the operator, an operating element in the form of a rod 124 having a bent end 125 is screwed into the opening in the T 120, but if it is desired to have a foot operated extension control, this rod is screwed into the opening in the T 123, which will permit it to swing freely with the T 123 on its shaft, while the end 125 will constitute the pedal to be pressed upon by the foot.

Up to this point has been given a detailed description of a rear end winch for the tractor. It is the purpose now to teach the idea of mounting this same winch upon the front of the tractor with as few changes therein as possible and with the greatest ease. This idea will be described as reversibility of position from front to rear and rear to front of the tractor. Before describing in detail the operation of changing the position of the winch from the rear to the front of the tractor, a description of this piece of equipment as mounted on the front of the tractor will be given.

Figure 7:
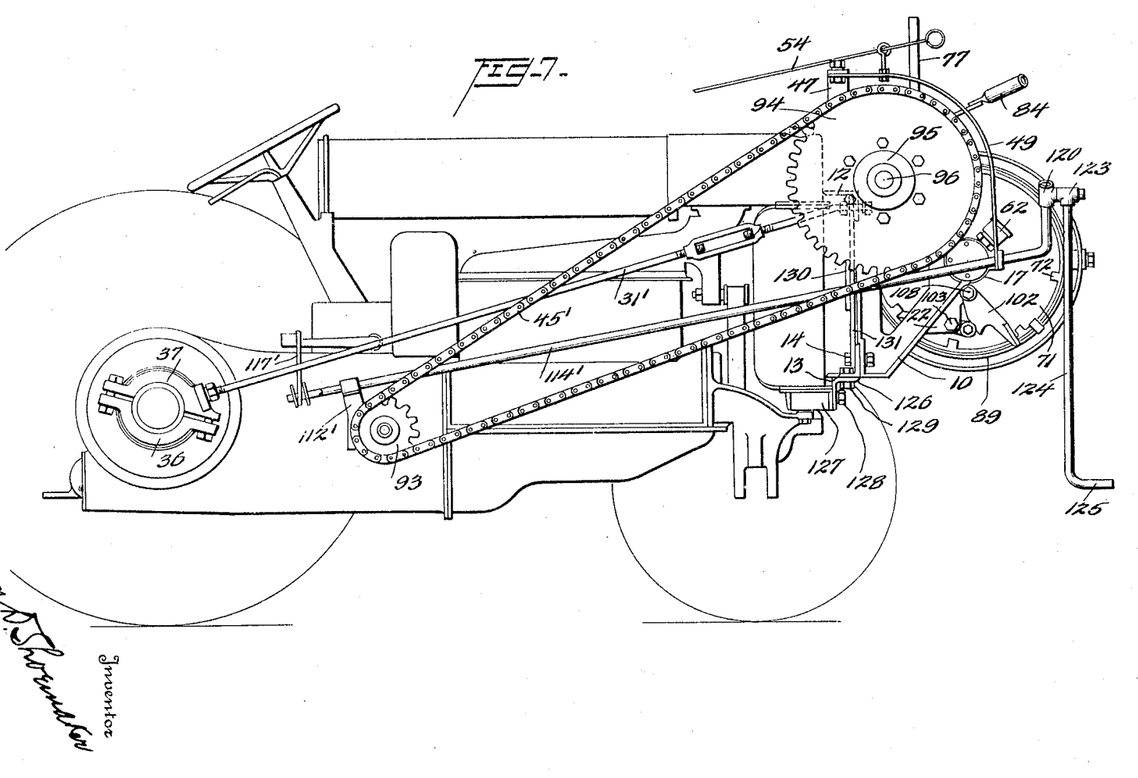
Fig. 7 is a side elevation of the tractor showing the hoist attachment mounted upon the front end thereof.
Figure 8:
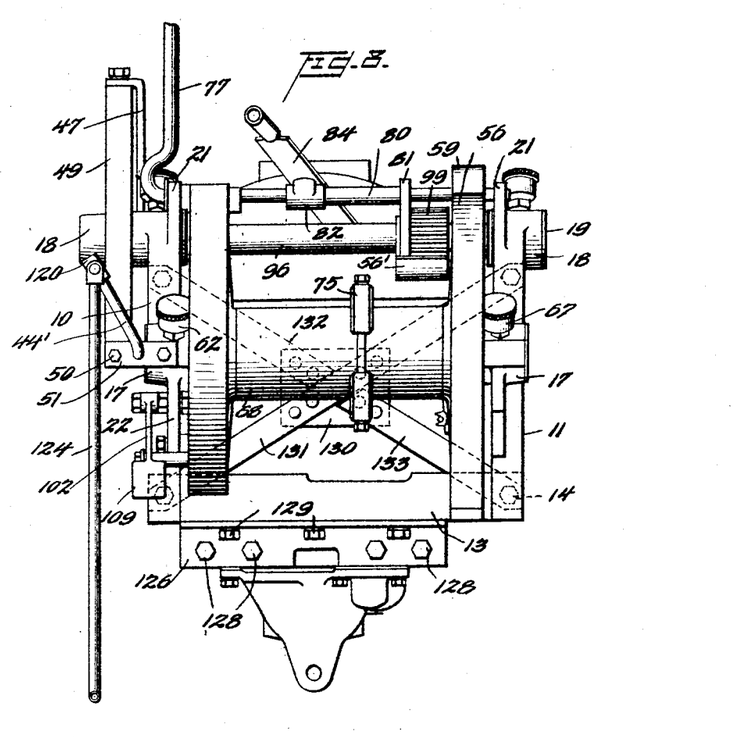
Fig. 8 is an end elevation of the attachment shown in Fig. 7.
Figure 9:
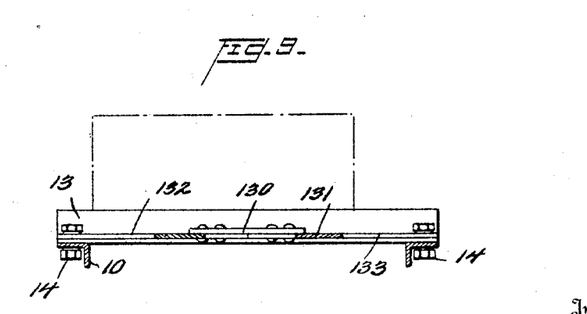
Fig. 9 is a detail.
Figure 10:
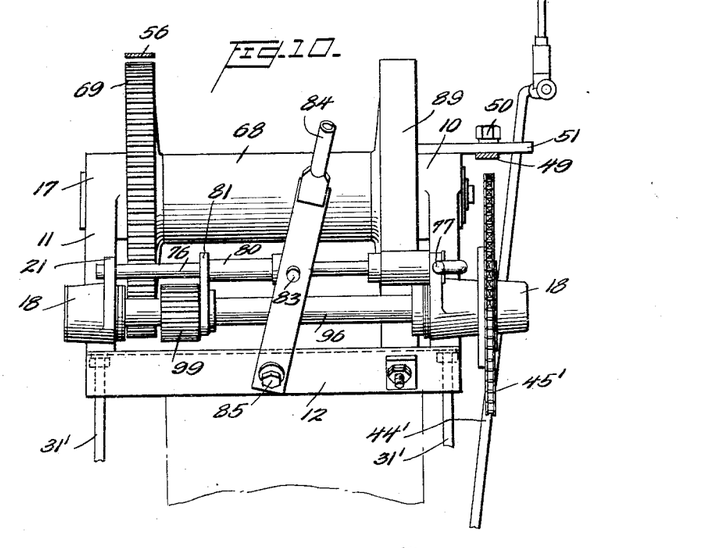
Figs. 10 and 11 are similar plans of the same winch when mounted upon the front and rear of the tractor, respectively, and illustrate the changeability in position of the several parts due to the change in position of mounting.
Figure 11:
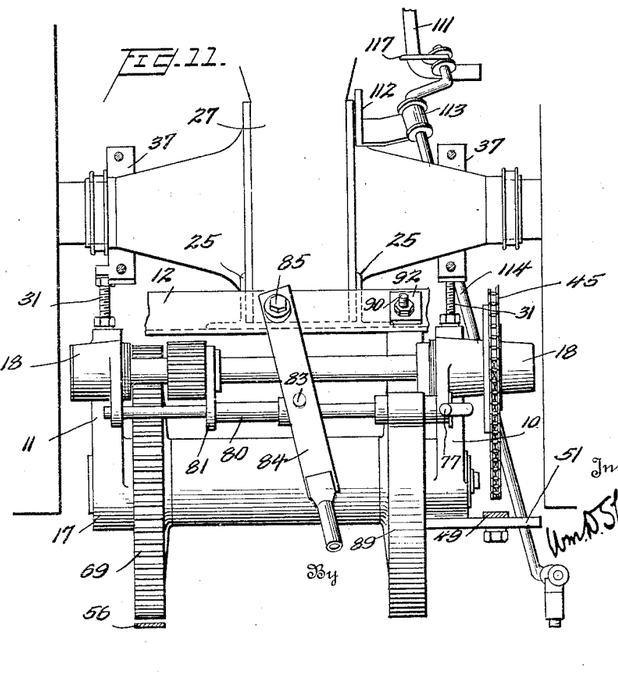

In Fig. 7, is shown a winch of this invention installed on the front of the tractor and in Figs. 8 and 9 is disclosed the brace which is employed in the winch frame, while Figs. 10 and 11 will enable one to compare the relative positions of the winch parts as they are with the winch mounted on the rear and on the front of the tractor.

Referring to Fig. 7 and comparing it with Fig. 1, it will be noted that the drive chain 45′ is somewhat longer than the drive chain 45, and that the control rod 114′ is longer than the control rod 114, and is mounted in a slightly different manner.

The strap 112′ is secured to the tractor at the point where the casing of the belt pulley shaft is attached rather than at the differential housing. The link 117′ is shorter than the link 117. The chain guard has been omitted because the necessity of guarding the chain when the winch is mounted on the front end is not present. The connector 31 has been replaced by a brace or tie rod 31′, which, however, screws into the clamp member 37 that has been revolved substantially 180 degrees on the axle housing. This tie rod connects the upper part of the winch frame with the axle housing and of course is present on both sides of the tractor. The mounting of the tractor is different.

The attaching angles 25 and 26 which secured the rear end winch to the differential housing have been omitted, and in lieu thereof, the winch has been supported at its lower end upon an angle 126, that is bolted upon the lower radiator casting 127 of the tractor. This casting 127 is the same casting that is employed on the Fordson tractor with the exception that it has been provided with tapped openings enabling the cap screws 128 to be passed through the lower leg of the angle 126 and into the casting, the bolts 129 securing the upper leg of the angle to the winch frame.

As pointed out in a copending application for patent of Frank L. Young Serial Number 259,296, filed March 5, 1928, for mounting for tractor equipment, this particular construction is designed for standardizing mountings for equipment at the front end of the tractor, and comprises braces from the upper portion of the equipment to the axle housing of the tractor, to the end that no damage will be done the tractor in the travel or use of the equipment.

When the steadying and bracing effects of the attaching angles in connection with the differential housing of the tractor are removed from the rear end winch it is necessary to substitute a brace for the winch frame before it can be safely mounted on the front of the tractor to sustain the various and sometimes excessive strains placed upon the tractor and equipment when in use. The brace selected for the purpose of illustration is what is known as a bridge brace and consists of the plate 130 across which is riveted the diagonal strap 131 and to which is riveted the short diagonal straps 132, 133, the extended ends of the three straps being attached to the winch side frames by the bolts which secure the upper and lower cross angles to the frame sides.

It will be appreciated that this bridge brace may be made in any strength necessary for the work, and that the position it occupies enables it to be constructed of angle members if found desirable, and it will be further appreciated that any standard type of frame bracing might be employed as a substitute for this bridge brace which in itself is old.

In industry, the gas tractor has been employed to perform many useful purposes and to this end a large number of pieces of equipment have been developed for both the rear end of the tractor and for the front end. There had been developed some few pieces of equipment which are found mounted on both the front and rear of the tractor. So far as known, the front end equipment has always differed materially in design and construction from the similar piece designed for the rear end. In no instance, has there been an attempt to provide a single piece of equipment which can be with equal readiness mounted upon either the front or the rear of the tractor.

There are many beneficial results which would flow from such a design and in this description an attempt will be made to point out some of the outstanding features of a piece of equipment having this qualification. It will be impossible to consider every type of equipment and therefore, the description will be limited to winches, or hoist attachments. However, it will be distinctly understood that in so confining the description, no intention is indicated to limit the invention to that particular type of equipment.

Purchasers of equipment for the tractor are prompted by different motives to select a piece of equipment mounted on the front or on the rear for vastly different reasons. They may have seen a piece mounted on the front in successful operation and conclude that such a piece was what they desired, whereas, another piece mounted on the rear of the tractor would be more suitable for their purposes.

It may be that the dealer who is attempting to sell this equipment was the exclusive agent for a front end piece, and therefore, magnified the good points, whereas, in reality, a rear end piece of equipment had many more good points. It may be that certain uses demand a front end piece of equipment, while other uses demand a similar piece mounted upon the rear of the tractor.

As an instance of this necessity, the hauling of very heavy pieces of machinery over very rough ground might be cited. The tractor equipped with the winch is advanced over the rough ground and the tractor and winch anchored. When the winch is used to pull up the piece of machinery to a point near the rear of the tractor and the operation is repeated, until the machinery has been brought into position where it is to be used. It will be appreciated that in such a use of the winch equipped tractor, only a rear end winch would be satisfactory. With a front end winch the tractor would have to be backed and much time would be lost in this operation.

From the viewpoint of the purchaser, therefore, it is of a distinct advantage to have a piece of equipment possessing the characteristic of reversibility of position, as herein defined; for if he unwittingly purchases a front end piece of equipment, whereas, a rear end piece would best serve his purpose, or if he is prevailed upon by a dealer to purchase a rear end piece when he should have a front end piece for his purpose, then nothing particularly disastrous has happened, if the equipment can be changed from one end of the tractor to the other.

The merchandiser of equipment is also greatly benefited by equipment having this characteristic. He is obliged to handle both front and rear end equipment of the same type, because his customers demand, some the one and some the other, and because the purposes for which tractor equipment is designed require some the one and some the other.

If now he has a piece of equipment designed for front end attachment in stock, he can convert it into a piece adapted for rear end attachment, and effect a sale which he would lose if the equipment he has does not possess this characteristic. He is benefited in a still further manner in that replacing of parts for both front end equipment and rear end equipment is facilitated, since a single stock of parts will enable him to service both the front and rear end equipment. This is in striking contrast to the condition as it exists today where a dealer is called upon to maintain two stocks of parts to serve front and rear end equipment, and where he must maintain both types of equipment in stock, in order that he might be able to furnish that which is called for.

The characteristic of reversibility in position from front to rear and from rear to front of a piece of equipment, typified by the winch shown in this specification, is accomplished by designing a framework and assemblies of elements, each having individual characteristics of this type.

Before setting forth the total reversibility in position of the equipment as a whole, each assembly will be taken up and its individual reversibility described. The frame assembly is not changed except for the elements thereof peculiar to the special type of attachment and these have been adequately set forth in the description of the front end winch.

The cross angles are in no different position with relation to the side frames in the two types. It is necessary, however, to form both side frames with corresponding parts, as the web 22 on which the holding pawl will be mounted. This web appears on both side frames, although only one is generally used for the holding pawl. However, the presence of these webs on both side frames is a distinct advantage in that, the holding pawl may be mounted on either the gear side of the winch or the brake drum side as the operator may elect or on both sides of the winch if the use to which it is placed demands.

On the other hand, the holding pawls may be entirely omitted from the winch and in their stead anchor means attached to these webs, similar in purpose and somewhat analogous in structure to the anchor shown in the patent to H. I. Eaton and F. A. Reiley, No. 1,455,575, May 15, 1923.

The guards, it will be noted, have all been formed, with the exception of a chain guard, to be detached from the position shown and mounted again at the opposite side of the frame in like position. As an instance, attention may be directed to the fact that the standard 60 shown in Fig. 5 as secured to the boss 20' may be mounted on the boss 20 shown in Fig. 4, and will then carry the guard 56 in the same relative position at the front of the machine.

It will be noted that the angle members of the frame have been apertured originally to permit of this reversibility. The clamp members 36 and 37 on each side of the machine are disconnected from the frame sides and the connectors 31 removed. The standard 46 is removed and the guard 44 for the chain eliminated. The clamp members are then loosened and revolved 180 degrees, approximately, when they are in position to receive the ends of the tie rods 31'. There is no further change in these clamp elements, in position of the guards and other parts. In short, the reversibility of the frame consists principally in making the side frame elements counterparts of each other, in providing suitable bolt holes in the frame angle members to permit of relative change in position of guards, and in forming the guards in such a manner that they can be shifted from one side of the frame to the other.

The spool assembly requires no change whatever and appears in the front end winch the same as in the rear, the brake drum being located on the belt pulley side of the tractor and the gear end of the spool being located on the opposite side of the tractor.

The countershaft and brake assembly is made reversible by locating the pivot support 85 centrally of the frame angle 12, and permitting the elements carried by the countershaft 96 and the shaft 76 to be unthreaded from the shafts and reinserted on them in reversed position. The only trouble which might be experienced in this connection is the spline which holds the eccentric 86 on the shaft 76. This will have to be removed and reinserted. However, this is accomplished with ease when the spline is designed for that purpose. The sprocket 93 of the drive assembly is not changed in position. The sprocket 94 of the winch is removed from the countershaft and again attached to the countershaft when the parts are reassembled for front end mounting.

As pointed out, the chain is made longer by the addition of links.

The pawl assembly is likewise made reversible and it is believed that such reversibility will be apparent from the detailed description heretofore given, and certainly after reading the description given of these parts in the application of Frank L. Young filed December 7, 1927, and bearing Serial Number 238,841.

It will be stated however, that all of the parts, trip pawl, sleeve and nuts may be taken off and reassembled in an exactly opposite position with respect to each other. In this condition, they can be placed on the opposite end of the machine as it stands on the rear end of the tractor and when so placed will be in exact working position on the front end of the tractor when the winch is reversed from rear to front.

The extension clutch control has required a few alterations. The rod 114 is lengthened and the strap 112 changed to the strap 112'.

The other parts of the extension clutch control are identical in both the front and rear end winches. In the case of link 117 it will be stated that this particular link is furnished straight and the end bent over into hooked form to engage the clutch pedal of the tractor by the mechanic who installs it so that while there is an apparent difference in length between the link shown in Fig. 1 and that shown in Fig. 7, there is in reality no difference except that the link is bent at a different point to form the hook when used in the two installations.

From the recital of the reversibility of the several assemblies, the quality of reversibility in position from front to rear or rear to front of the tractor ought to be understood but in order that this might be made perfectly clear, in Figs. 10 and 11 is shown the winch mounted upon both ends of the tractor. The figures are so placed on the sheet that one can compare the relative positions of different elements or assemblies, and parts of the machine are broken away to facilitate this.

In passing it might be noted that the reversibility in position of this piece of equipment depends upon the reversibility in position of its component assemblies, and that these assemblies are reversible individually, but not all in the same sense. The frame is reversible because its two ends are made similar in respect to one another and provision is made for attaching guards and the like with equal facility at either side of the frame. The spool assembly is simply transferred from the one position to the other without change. The drive assembly is the same in both machines with the exception that the chain is made longer. The countershaft assembly is reversed in position by disassembling the parts and reassembling them in reverse order.

The clamps are reversed by shifting them through an angle of 180 degrees approximately. The pawl assembly is reversed by disassembling the parts and reassembling them in reversed position. The extension clutch control is slightly altered in length and attachment to the tractor. The several assemblies, however, when subjected to their own peculiar reverse-in-position qualification, contribute to the securing of the total reversibility of the winch.

In accomplishing the change of position of equipment from one end of the tractor to the other, it is necessary to take one side frame off. This is demanded by the fact that the bearing blocks have been made as integral parts of the side frames. If, however, the bearing blocks were made as separate elements from the side frames, then the reversibility of the winch could be accomplished by first removing the bearing blocks with the parts that they carry, and in that case it will not be necessary to detach one of the side frames. This is well illustrated by reference to the showing of the patent to Harry S. Myers, No. 1,557,470, October 13, 1925, for hoist attachment for tractors.

What is claimed is:

1. In a tractor-equipment combination, a tractor and a piece of equipment in the nature of an attachment adapted to be mounted upon either the front or the rear of the tractor and to be driven from the tractor power plant, said equipment attachment comprising parts possessing the individual characteristic of reversibility to permit the attachment to be mounted upon either of its positions on the tractor.

2. In a piece of equipment for a tractor, a frame adapted to be attached to either the rear or the front of the tractor and assemblies of elements adapted to be mounted in reversed positions on said frame, to permit a driving of equipment parts in either of its positions on the tractor.

3. In a piece of equipment for a tractor, a frame adapted to be mounted upon the tractor at a plurality of points, and component assemblies adapted to be reversed in position to fit the frame in any of its mounted positions, to permit a driving of equipment parts in any position of said frame upon the tractor.

4. In a tractor-equipment combination in which the tractor is provided with a belt pulley shaft for supplying power to the equipment, a piece of equipment comprising a frame and movable elements adapted to be driven from the belt pulley shaft of the tractor, said frame adapted to be mounted on said tractor in a plurality of positions, and said moveable elements being embodied in assemblies adapted to be reversed in position with respect to said frame and to said belt pulley shaft.

5. In a tractor-equipment combination, a piece of equipment comprising a frame and component machine parts carried by said frame, the frame being adapted to be mounted on said tractor in a plurality of positions, and said component machine parts, being capable of association with said frame in different relationships to accord with the particular position of the frame on the tractor.

6. In a tractor-equipment combination, a tractor, an equipment frame adapted to be mounted upon either the front or the rear of said tractor, moveable and stationary elements forming with said frame a piece of tractor equipment, said elements possessing in various ways the characteristic of reversibility with respect to the frame to permit the change of location of the equipment frame from one of its said positions on the tractor to the other.

7. In a tractor-winch combination, a winch frame adapted to be mounted upon either the front or the rear of the tractor, and active winch elements associated with said frame and possessing the characteristic of individual reversibility with respect thereto to permit the change of location of the equipment from one of its said positions on the tractor to the other.

8. In a tractor-winch combination, a tractor provided with a belt pulley shaft for supplying power to the winch elements, a winch frame adapted to be mounted upon either the front or the rear of the tractor, and which elements associated with said frame, the spool receiving power from said tractor belt pulley shaft, said winch elements possessing the individual characteristic of reversibility with respect to the frame to permit of the change of location of the frame from one of its positions on the tractor to the other.

9. In a tractor-winch combination, a tractor provided with a belt pulley shaft projecting from one side thereof for supplying power to the winch elements, a winch frame adapted to be mounted upon either the front or the rear of the tractor, a spool, drive elements adapted to receive power for said tractor belt pulley shaft and impart it to the spool, and controls for said spool and drive elements, said spool drive elements and controls possessing the characteristic of reversibility with respect to said tractor and frame to permit the frame to be shifted from one of its positions on the tractor to another.

10. In a tractor-winch combination, a tractor and a hoist attachment therefor comprising a plurality of component parts and adapted to be mounted upon either the front or the rear of the tractor, the component parts of said hoist attachment possessing individually the characteristic of reversibility with respect to said tractor to permit of the change of position of the attachment from one of its positions on the tractor to the other.

11. In a tractor-equipment combination, a tractor comprising rear axle housings, an attachment comprising a piece of equipment designed to be mounted upon either the front or the rear of the tractor, and elements carried by the axle housings and forming a part of the mounting of said equipment attachment in either its front or rear position on the tractor.

12. In a tractor-equipment combination, a tractor comprising rear axle housings, and elements mounted on the axle housings and forming a part of either a front end mounting or a rear end mounting for tractor equipment.

13. In a tractor-equipment combination, a tractor comprising axle housings in which irregularities are provided, a piece of equipment for said tractor in the nature of a tractor attachment, and means for transmitting the stresses set up in said equipment in a direct line to the axle housings comprising clamp elements mounted on said axle housings and removed from the said irregularities, and members for maintaining said clamp elements spaced from said irregularities.

14. In a hoist attachment for tractors, a frame comprising right and left side members of similar design, active winch elements supported in said side members and reversible in position within said frame, and guards for said active winch elements adapted to be mounted on said frame at either side thereof to fit the active winch elements in either of their positions in the frame.

15. In a hoist attachment for tractors, a frame comprising right and left side members of similar design, a spool comprising a gear and a brake drum and adapted to be mounted in said frame in either of two positions, a countershaft assembly whose component parts are adapted to be assembled to match either position of said spool, and guards for the spool gear and parts of the countershaft assembly adapted to be mounted in said frame to fit either spool position.

16. In a hoist attachment for tractors, a frame, a spool carrying a gear and a brake drum, a countershaft carrying a sliding pinion meshing with the gear of the drum, and a sprocket through which said countershaft is driven, a brake band, guards for said gears and sprocket, and controls for said sliding of said pinion and the applying of the said brake band to the drum, the frame and other winch elements being so formed as to permit of a reversal of position of said winch elements within said frame to make of it a right hand or a left hand winch.

In testimony whereof I affix my signature.

WILLIAM D. SHOEMAKER.